United States Patent
Moe et al.

(10) Patent No.: US 7,687,717 B2
(45) Date of Patent: Mar. 30, 2010

(54) COAXIAL CABLE INCLUDING TUBULAR BIMETALLIC INNER LAYER WITH BEVELLED EDGE JOINT AND ASSOCIATED METHODS

(75) Inventors: Alan N. Moe, Hickory, NC (US); Larry W. Nelson, Hickory, NC (US)

(73) Assignee: Commscope Inc. of North Carolina, Hickory, NC (US)

( * ) Notice: Subject to any disclaimer, the term of this patent is extended or adjusted under 35 U.S.C. 154(b) by 6 days.

(21) Appl. No.: 11/957,020

(22) Filed: Dec. 14, 2007

(65) Prior Publication Data

US 2009/0151975 A1  Jun. 18, 2009

(51) Int. Cl.
*H01B 7/18* (2006.01)

(52) U.S. Cl. ................................... 174/106 R

(58) Field of Classification Search ................... 174/36, 174/102 R, 106 R
See application file for complete search history.

(56) References Cited

U.S. PATENT DOCUMENTS

| | | | |
|---|---|---|---|
| 2,199,150 A | 4/1940 | Chace | |
| 2,759,990 A | 8/1956 | Bean | |
| 2,819,517 A * | 1/1958 | Pursell | 228/168 |
| 3,327,383 A | 6/1967 | Reed | |
| 3,360,409 A | 12/1967 | Jachimowicz et al. | |
| 3,405,228 A | 10/1968 | Polizzano | |
| 3,541,221 A | 11/1970 | Aupoix et al. | |
| 3,717,719 A * | 2/1973 | Smith et al. | 174/107 |
| 3,823,253 A | 7/1974 | Walter et al. | 174/69 |
| 3,940,049 A | 2/1976 | Richter et al. | 228/107 |
| 4,250,351 A | 2/1981 | Bridges | 174/106 |
| 4,349,243 A | 9/1982 | Amano et al. | 350/96.23 |
| 4,567,321 A | 1/1986 | Harayama | 174/117 |
| 4,811,888 A * | 3/1989 | Ziemek et al. | 228/148 |
| 4,816,611 A | 3/1989 | Invernizzi | 174/2 |
| 5,298,682 A | 3/1994 | Salz | 174/105 |
| 5,500,488 A | 3/1996 | Buckel | 174/102 |
| 5,946,798 A | 9/1999 | Buluschek | 29/828 |
| 6,137,058 A | 10/2000 | Moe et al. | 174/102 |
| 6,201,189 B1 | 3/2001 | Carlson et al. | 174/102 |
| 6,246,008 B1 | 6/2001 | Fluckiger et al. | 174/126.1 |
| 6,342,677 B1 | 1/2002 | Lee | 174/106 |
| 6,417,454 B1 | 7/2002 | Biebuyck | 174/106 |
| 6,509,521 B1 | 1/2003 | Geitz | 174/28 |
| 6,696,647 B2 | 2/2004 | Ono et al. | 174/102 |
| 6,697,647 B2 | 2/2004 | Higuchi et al. | 455/567 |
| 6,717,493 B2 | 4/2004 | Chopra et al. | 333/237 |
| 6,800,809 B2 | 10/2004 | Moe et al. | 174/102 |

(Continued)

FOREIGN PATENT DOCUMENTS

EP    1469486    10/2004

*Primary Examiner*—Chau N Nguyen
(74) *Attorney, Agent, or Firm*—Allen, Dyer, Doppelt, Milbrath & Gilchrist, P.A.

(57) ABSTRACT

A coaxial cable may include an inner conductor, an outer conductor, and a dielectric material layer therebetween. The inner conductor may include a tubular bimetallic layer having a pair of opposing longitudinal edges at a longitudinal seam. The tubular bimetallic layer may include an inner metal layer and an outer metal layer bonded thereto with the inner metal layer having a lower melting point than the outer layer. At least one of the opposing longitudinal edges of the tubular bimetallic layer may be at least partially bevelled. In addition, the longitudinal seam may include a welded joint between at least portions of the opposing longitudinal edges.

22 Claims, 5 Drawing Sheets

U.S. PATENT DOCUMENTS

| | | |
|---|---|---|
| 6,831,231 B2 | 12/2004 | Perelman et al. ............ 174/102 |
| 6,953,888 B2 | 10/2005 | Livshitz et al. ................ 174/28 |
| 6,963,032 B2 | 11/2005 | Yamaguchi et al. ......... 174/102 |
| 7,034,228 B2 | 4/2006 | Yokoi et al. ................. 174/102 |
| 2003/0051897 A1 | 3/2003 | Blouin et al. ............... 174/106 |
| 2004/0089462 A1 | 5/2004 | Buckel ...................... 174/15.1 |
| 2004/0118591 A1 | 6/2004 | Bufanda et al. ............. 174/106 |
| 2005/0092513 A1 | 5/2005 | Brunker et al. ............. 174/102 |

\* cited by examiner

COAXIAL CABLE INCLUDING TUBULAR BIMETALLIC INNER LAYER WITH BEVELLED EDGE JOINT AND ASSOCIATED METHODS

FIELD OF THE INVENTION

The present invention relates to the field of communications, and, more particularly, to coaxial cables and associated methods for making the coaxial cables.

BACKGROUND OF THE INVENTION

Coaxial cables are widely used to carry high frequency electrical signals. Coaxial cables enjoy a relatively high bandwidth, low signal losses, are mechanically robust, and are relatively low cost. A coaxial cable typically includes an elongate inner conductor, a tubular outer conductor, and dielectric separating the inner and outer conductors. For example, the dielectric may be a plastic foam material. An outer insulating jacket may also be applied to surround the outer conductor.

One particularly advantageous use of coaxial cable is for connecting electronics at a cellular or wireless base station to an antenna mounted at the top of a nearby antenna tower. For example, the transmitter and receiver located in an equipment shelter may be coupled via coaxial cables to antennas carried by the antenna tower. A typical installation includes a relatively large diameter main coaxial cable extending between the equipment shelter and the top of the antenna tower to thereby reduce signal losses. For example, CommScope, Inc. of Hickory, N.C. offers its CellReach® coaxial cable for such applications.

In larger diameter coaxial cables, which are commonly used in cellular communication as described above, the elongate inner conductor can be tubular in shape. The tubular inner conductor may also surround an inner dielectric material. The inner conductor is typically manufactured by forming a flat layer or sheet of conductive material into a tube with a longitudinal seam and welding the seam to form a continuous joint. The outer conductor is also similarly manufactured by forming a flat layer or metal sheet into a tube with a longitudinal seam that is welded to form a continuous joint.

The high frequency signals carried by the coaxial cable are concentrated in only a small portion, radially outermost, of the inner conductor, and a correspondingly small radially innermost portion of the outer conductor. This characteristic is attributed to the electromagnetic phenomenon called the skin effect. Therefore, only the thin outer radial portion of the tubular inner conductor carries the high frequency transmission. Conversely, the outer tubular conductor also carries the high frequency signals in the thin radially innermost portion.

Bimetallic layers have been used for the inner and/or outer tubular conductors in a coaxial cable where a higher conductivity and more expensive metal is used to provide the radially outermost portion of an inner conductor, and is used to provide the radially innermost portion of the outer conductor. For example, the outermost layer of the inner conductor may include a relatively costly and highly conductive metal such as copper, and the inner layer of the inner conductor may include a less costly and less conductive metal, such as aluminum. For example, U.S. Pat. No. 6,717,493 B2 to Chopra et al. and U.S. Patent Application No. 2004/0118591 A1 to Bufanda et al. each discloses a coaxial cable with such bimetallic tubular inner conductors.

Notwithstanding the benefits of a bimetal tubular inner conductor, there may be some shortcomings. For example, the manufacture of a bimetal tubular inner conductor usually involves some form of heat based welding, such as for example, conventional induction welding, to weld the seam to form a welded joint. Unfortunately, the two metals that form the bimetal tubular inner conductor usually have different melting temperatures. For example, copper and aluminum are commonly used as the outer and inner layers of the inner conductor, respectively. Copper has a melting point of 1100° C. and a conductivity of $59.6 \times 10^6 S \cdot m^{-1}$, while aluminum has a lower melting point of 660° C. and a lower conductivity of $37.8 \times 10^6 S \cdot m^{-1}$. This disparity in melting points makes welding of the joint relatively difficult.

In response to this particular shortcoming in manufacture of bimetal tubular inner conductors, coaxial cable manufacturers have developed a coaxial cable with a bimetal tubular inner conductor comprising an inlaid bimetallic layer, such as disclosed, for example, in U.S. Pat. No. 6,342,677 to Lee. This coaxial cable is more easily welded since only the inner metal layer is welded during manufacture of the bimetal tubular inner conductor. Nonetheless, the inlaid bimetal inner conductor is relatively costly to manufacture. Of course, similar considerations apply to the outer conductor of a coaxial cable. That is a conventional bimetallic layer may be difficult to weld, and an inlaid bimetallic layer may be relatively expensive.

SUMMARY OF THE INVENTION

In view of the foregoing background, it is therefore an object of the present invention to provide a coaxial cable including an inner conductor fabricated using a less expensive tubular bimetallic layer that is also readily welded at its longitudinal seam This and other objects, features and advantages in accordance with the present invention are provided by a coaxial cable comprising an inner conductor including a tubular bimetallic layer having a pair of opposing longitudinal edges at a longitudinal seam. The tubular bimetallic layer may comprise an inner metal layer and an outer metal layer bonded thereto with the inner metal layer having a lower melting temperature than the outer metal layer. At least one of the opposing longitudinal edges of the tubular bimetallic layer may be at least partially beveled. In addition, the longitudinal seam may comprise a welded joint between at least portions of the opposing longitudinal edges. Accordingly, a less expensive starting material may be used for the inner conductor, that is, a simple bimetallic strip with one or both edges beveled, as compared to the more expensive inlaid bimetallic strip, for example. The at least one beveled edge may advantageously permit the lower melting temperature metal edges to be softened and pressed together to form the welded joint, while the higher melting temperature edges may remain solid, at least initially separated, and thereby not interfere with the welding of the lower temperature metal edges.

In some embodiments, each longitudinal edge of the tubular bimetallic layer may be at least partially beveled to define a notch at the longitudinal seam. For example, the at least one opposing longitudinal edge may be at least partially beveled at an angle from normal to an inner surface of the tubular bimetallic layer in a range of between 20 and 70 degrees.

The outer metal layer may have a greater electrical conductivity than the inner metal layer. For example, the inner metal layer may comprise aluminum, and the outer metal layer may comprise copper.

The tubular bimetallic layer may have a thickness in a range of about 0.005 to 0.050 inches. In addition, the outer metal layer may have a percentage thickness relative to an overall thickness of the tubular bimetallic layer in a range of about 1 to 30%.

The coaxial cable may further comprise another dielectric material layer filling the tubular bimetallic layer. The cable may also further include an insulating jacket surrounding the outer conductor.

A method aspect is for making a coaxial cable comprising an inner conductor, an outer conductor and a dielectric material layer therebetween. The method may include forming the inner conductor by at least forming a bimetallic strip into a tubular bimetallic layer having a pair of opposing longitudinal edges at a longitudinal seam with the tubular bimetallic layer comprising an inner metal layer and an outer metal layer bonded thereto and with the inner metal layer having a lower melting temperature than the outer metal layer, and at least one of the opposing longitudinal edges of the tubular bimetallic layer being at least partially beveled. Forming the inner conductor may further include welding the longitudinal seam to form a welded joint between at least portions of the opposing longitudinal edges. The method may further comprise forming the dielectric material layer surrounding the inner conductor, and forming the outer conductor surrounding the dielectric material layer.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
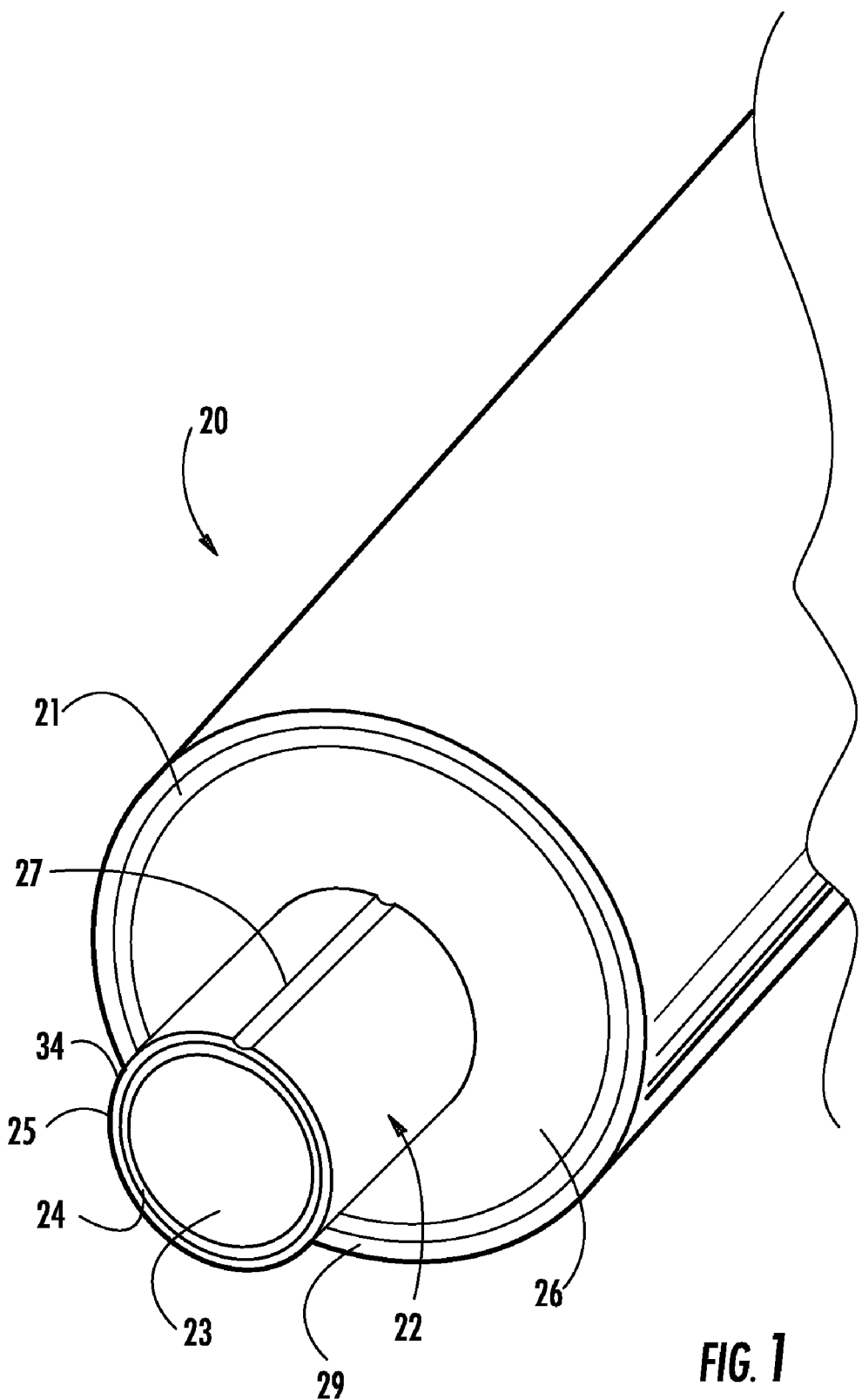
FIG. 1 is a perspective end view of a coaxial cable in accordance with the present invention.
Figure 2:
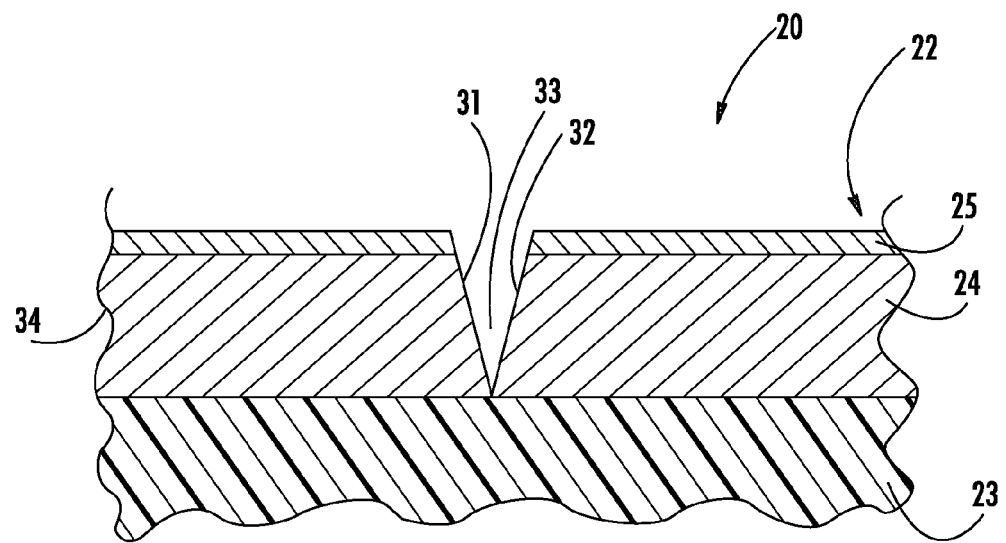
FIG. 2 is an enlarged cross-sectional view of a portion of the tubular bimetallic inner conductor of the coaxial cable of FIG. 1 shown prior to welding.
Figure 3:
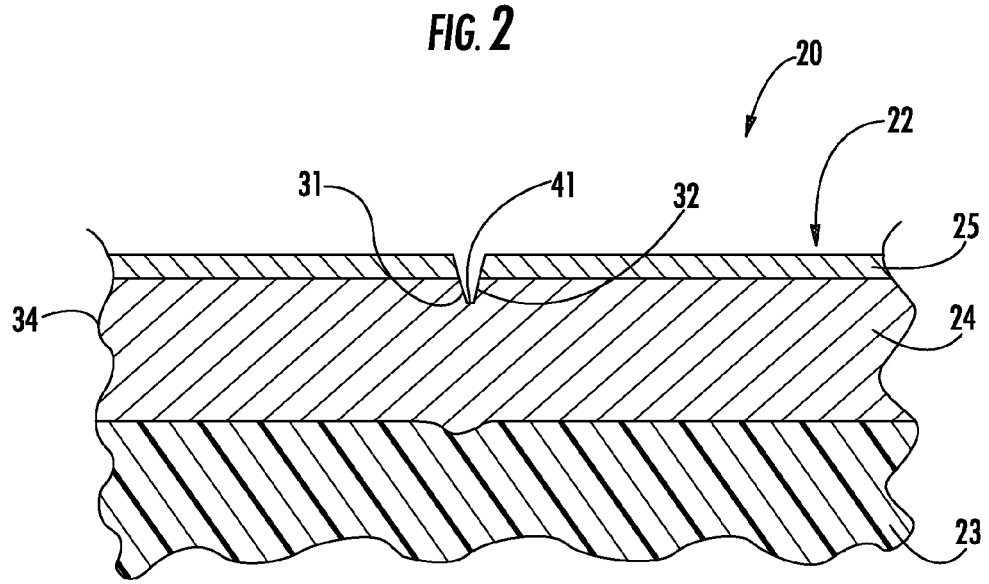
FIG. 3 is a cross-sectional view of the portion of the tubular bimetallic inner conductor of FIG. 2 shown after welding.

Referring initially to FIGS. 1-3, a coaxial cable 20 in accordance with the present invention is now described. The coaxial cable 20 illustratively includes an outer conductor 21, and a dielectric material layer 26 formed between an inner conductor 22 and the outer conductor.

The inner conductor 22 illustratively includes a tubular bimetallic layer 34 having a pair of opposing longitudinal edges 31, 32 at a longitudinal seam 27. The tubular bimetallic layer 34 illustratively includes an inner metal layer 24 and an outer metal layer 25 bonded thereto. The inner metal layer 24 may have a lower electrical conductivity and a lower melting temperature, for example, than the outer metal layer 25 of the tubular bimetallic layer 34, such as to facilitate welding, for example, as described in greater detail below. For example, the inner metal layer 24 may comprise aluminum or any other suitable metal as will be appreciated by one skilled in the art. The outer metal layer 25 may have a higher electrical conductivity than the inner metal layer 24 to facilitate signal carrying ability at the skin depth, for example. The outer metal layer 25 may comprise copper, for example, or any other suitable metal as will be appreciated by one skilled in the art. Aluminum is also less expensive than copper.

In the illustrated embodiment, both of the opposing longitudinal edges 31, 32 of the tubular bimetallic layer 34 are beveled, and the longitudinal seam 27 illustratively includes a welded joint 41 (FIGS. 1 and 3) between at least portions of the inner metal layer 24. Prior to welding, as illustrated in FIG. 2, the edges of the inner metal layer 24 may be touching or more closely spaced than the edges of the outer metal layer 25. Furthermore, when both of the opposing longitudinal edges 31, 32 of the tubular bimetallic layer 34 are beveled; they may define a V-shaped notch 33 at the longitudinal seam 27 prior to welding. Both of the opposing longitudinal edges 31, 32 may be beveled at an angle from normal to an inner surface of the tubular bimetallic layer 34 in a range of between 20 and 70 degrees, for example.

The welding of the opposing longitudinal edges 31, 32 of the tubular bimetallic layer 34 results in a welded joint 41. The welding can be accomplished through induction welding, for example, or any other suitable method as will be appreciated by a person skilled in the art. Both of the opposing longitudinal edges 31, 32 being beveled may advantageously permit the lower melting temperature metal edges to be softened and pressed together to form the welded joint 41, while the higher melting temperature edges may remain solid, at least initially separated, and thereby not interfere with the welding of the lower temperature metal edges. Advantageously, the welding process can be matched to the characteristics of only the inner metal layer 24, which is typically more easily welded due to the lower melting temperature.

After welding, as illustrated in FIG. 3, the opposing longitudinal edges 31, 32 of the tubular bimetallic layer 34 may define a smaller, partially closed notch at the welded joint 41. Alternatively, the opposing longitudinal edges 31, 32 of the tubular bimetallic layer 34 may define a flush meeting joint, an outwardly protruding outer metal layer portion, or an outwardly protruding outer metal layer portion that is subsequently trimmed in other embodiments.

The exemplary dimensions of the tubular bimetallic layer 34 are as follows. The tubular bimetallic layer 34 may have a thickness in a range of about 0.005 to 0.050 inches. In addition, the outer metal layer 25 may have a percentage thickness relative to an overall thickness of the tubular bimetallic layer in a range of about 1 to 30%.

The coaxial cable illustratively includes another dielectric material layer 23 filling the inner conductor 22. As appreciated by one skilled in the art, this dielectric material may be a rod formed prior to forming the inner conductor 22, or thereafter using settable material as described in U.S. Pat. No. 6,915,564, also assigned to the assignee of the present invention, the entire contents of which are incorporated here by reference. The coaxial cable illustratively includes an insulating jacket 29 surrounding the outer conductor 21.

Figure 4:
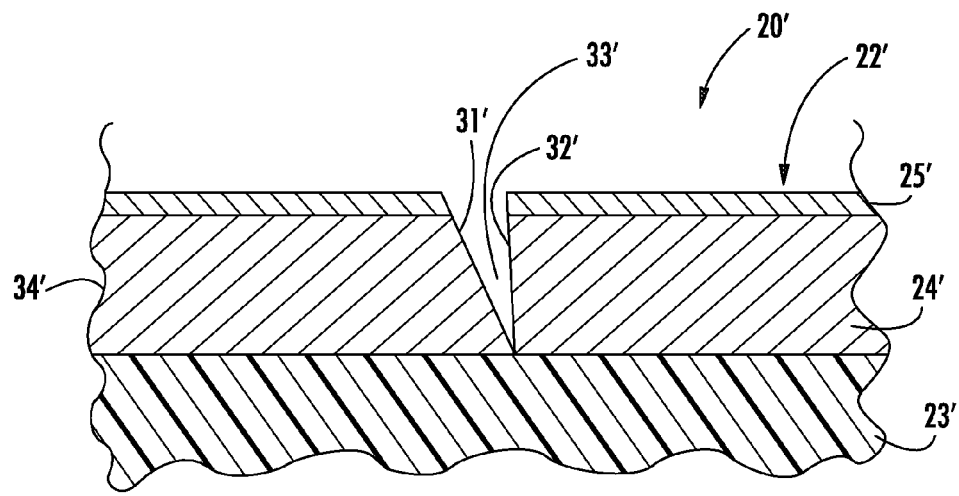
FIG. 4 is an enlarged cross-sectional view of a portion of a tubular bimetallic inner conductor of another embodiment of a coaxial cable shown prior to welding.
Figure 5:
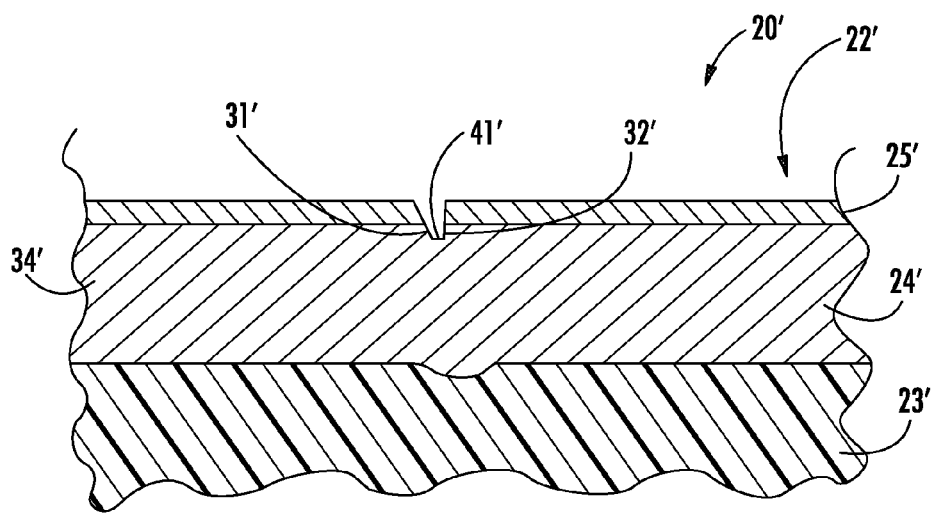
FIG. 5 is a cross-sectional view of the portion of the tubular bimetallic inner conductor of FIG. 4 shown after welding.

Referring now additionally to FIGS. 4 and 5, another embodiment is now described. In this embodiment of the cable 20', those elements already discussed above with respect to FIGS. 1-3 are given prime notation and most require no further discussion herein. This embodiment differs from the previous embodiment in that only one of the longitudinal edges 31', 32' of the tubular bimetallic layer 34' is beveled.

Figure 6:
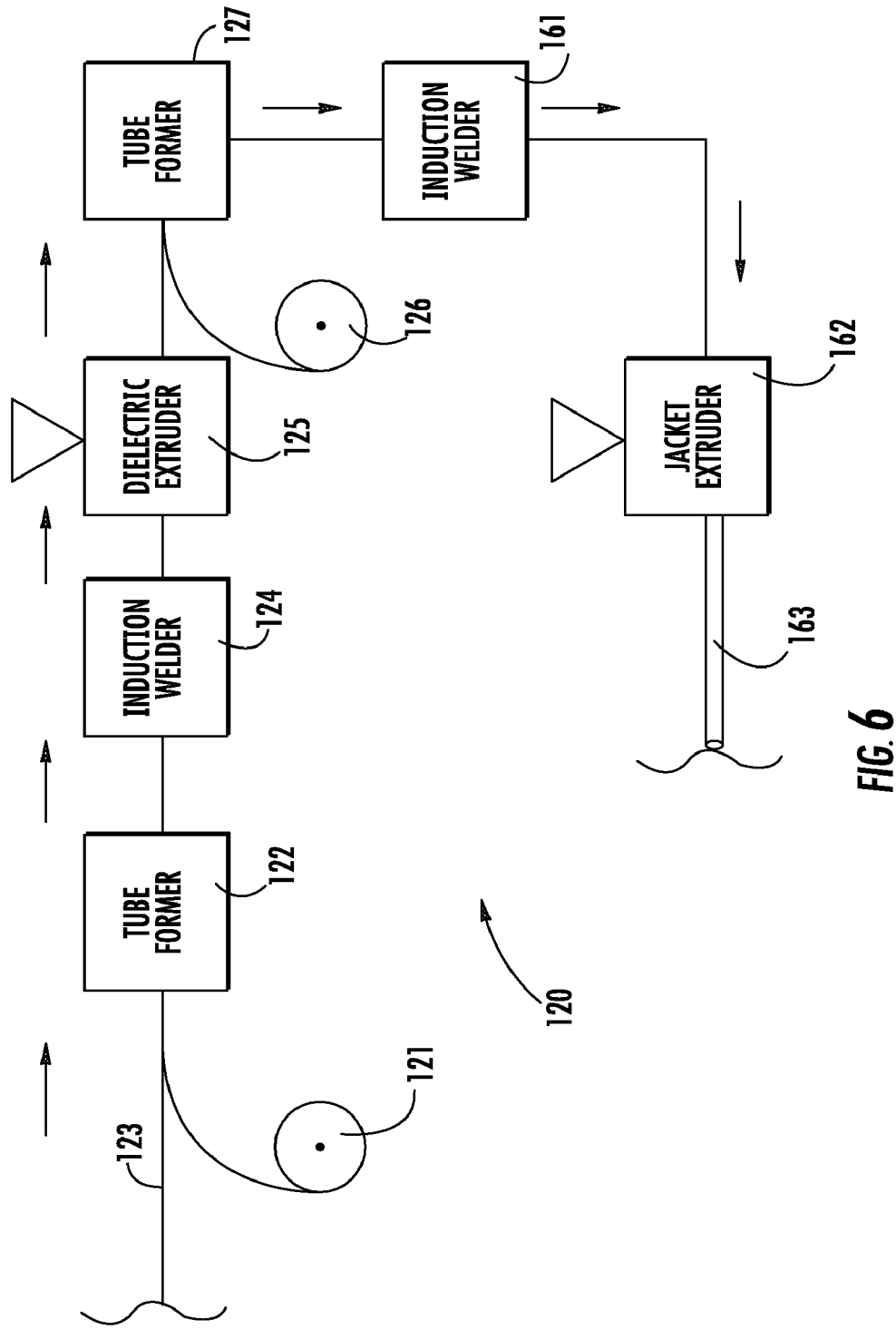
FIG. 6 is schematic diagram of an apparatus for making the coaxial cable in accordance with the present invention.

Illustrated in FIG. 6, another aspect relates to an apparatus 120 and a method for making a coaxial cable 20 including the inner conductor 22 comprising the tubular bimetallic layer 34. A dielectric material rod 123 and a supply reel 121 for the bimetallic strip are provided. The bimetallic strip may have a pair of longitudinal edges with at least one edge being beveled prior to being wound onto the supply reel 121.

The longitudinal edges may be beveled at an angle from normal to an inner surface of the bimetallic strip. The beveled angle may be in the range of between 20 and 70 degrees. The inner metal layer may comprise a metal of lower melting temperature and lower electrical conductivity than the metal of the outer metal layer. The inner metal layer may comprise aluminum or any other suitable metal as will be appreciated by one skilled in the art. The outer metal layer may comprise copper or any other suitable metal as will be appreciated by one skilled in the art. The dielectric material rod 123 and the bimetallic strip are fed into the tube former 122. The tube former 122 illustratively forms the inner conductor surrounding the dielectric material rod 123 and having a tubular bimetallic layer having a pair of opposing longitudinal edges at a longitudinal seam.

The inner conductor is then fed into the induction welder 124, which illustratively welds the longitudinal seam to form a welded joint between at least portions of the inner metal layer of the tubular bimetallic layer. As will be appreciated by one skilled in the art, the dielectric material may be disposed inside the inner conductor downstream from the tube former 122, or thereafter using settable material as described in U.S. Pat. No. 6,915,564.

The inner conductor is fed into the dielectric extruder 125, which illustratively forms a dielectric material layer surrounding the inner conductor. The outer conductor is illustratively formed surrounding the dielectric material layer by feeding a supply reel 126 of conductor strip and the output of the dielectric extruder 125 into a second tube former 127.

The output of the second tube former 127 is fed into the second induction welder 161, which illustratively welds the outer conductor. The coaxial cable 163 is complete when the jacket extruder 162 illustratively forms an insulating jacket surrounding the outer conductor. The coaxial cable 163 is output from the jacket extruder 162 for take-up on a suitable take-up reel, not shown.

Figure 7:
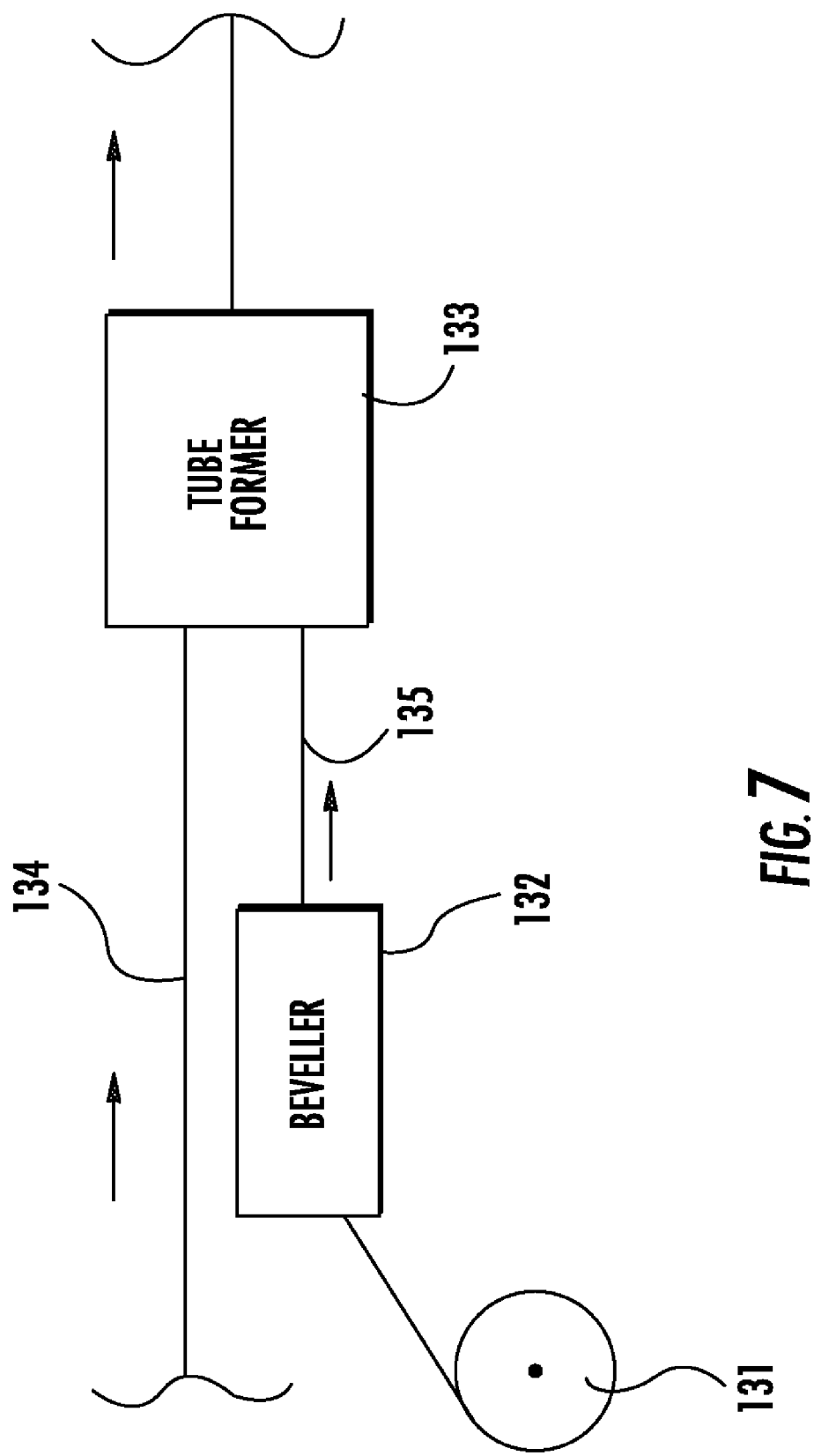
FIG. 7 is a schematic diagram of a portion of another apparatus for making the coaxial cable in accordance with the present invention.

With additional reference to FIG. 7, the above apparatus and method can be modified to use a supply reel 131 of bimetallic strip without at least one longitudinal edge beveled. In other words, the strip from the supply reel 131 is first fed into a beveller 132, which bevels at least one longitudinal edge of the bimetallic strip. The bimetallic strip with at least one longitudinal edge being beveled 135 is input into the tube former 133 with the dielectric material rod 134.

This application is related to co-pending patent applications entitled, COAXIAL CABLE INCLUDING TUBULAR BIMETALLIC INNER LAYER WITH ANGLED EDGES AND ASSOCIATED METHODS, U.S. patent application Ser. No. 11/957,042; COAXIAL CABLE INCLUDING TUBULAR BIMETALLIC INNER LAYER WITH FOLDED EDGE PORTIONS AND ASSOCIATED METHODS, U.S. patent application Ser. No. 11/957,063; COAXIAL CABLE INCLUDING TUBULAR BIMETALLIC OUTER LAYER WITH BEVELLED EDGE JOINT AND ASSOCIATED METHODS, U.S. patent application Ser. No. 11/957,070; COAXIAL CABLE INCLUDING TUBULAR BIMETALLIC OUTER LAYER WITH ANGLED EDGES AND ASSOCIATED METHODS, U.S. patent application Ser. No. 11/957,089; and COAXIAL CABLE INCLUDING TUBULAR BIMETALLIC OUTER LAYER WITH FOLDED EDGE PORTIONS AND ASSOCIATED METHODS, U.S. patent application Ser. No. 11/957,100 which are filed on the same date and by the same assignee and inventors, the disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A coaxial cable comprising:
    an inner conductor, an outer conductor and a dielectric material layer therebetween;
    said inner conductor comprising a tubular bimetallic layer having a pair of opposing longitudinal edges at a longitudinal seam;
    said tubular bimetallic layer comprising an inner metal layer and an outer metal layer bonded thereto with said inner metal layer having a lower melting temperature than said outer metal layer;
    at least one of said opposing longitudinal edges of said tubular bimetallic layer being at least partially beveled;
    the longitudinal seam comprising a welded joint between at least portions of said opposing longitudinal edges.

2. A coaxial cable according to claim 1 wherein each longitudinal edge of said tubular bimetallic layer is at least partially bevelled to define a notch at the longitudinal seam.

3. A coaxial cable according to claim 1 wherein the at least one opposing longitudinal edge is at least partially bevelled at an angle from normal to an inner surface of said tubular bimetallic layer in a range of between 20 and 70 degrees.

4. A coaxial cable according to claim 1 wherein said outer metal layer has a greater electrical conductivity than said inner metal layer.

5. A coaxial cable according to claim 1 wherein said inner metal layer comprises aluminum.

6. A coaxial cable according to claim 1 wherein and said outer metal layer comprises copper.

7. A coaxial cable according to claim 1 wherein said wherein said tubular bimetallic layer has a thickness in a range of about 0.005 to 0.050 inches.

8. A coaxial cable according to claim 1 wherein said outer metal layer has a percentage thickness relative to an overall thickness of said tubular bimetallic layer in a range of about 1 to 30 %.

9. A coaxial cable according to claim 1 further comprising another dielectric material layer filling said tubular bimetallic layer.

10. A coaxial cable according to claim 1 further comprising an insulating jacket surrounding said outer conductor.

11. A coaxial cable comprising:
    an inner conductor, an outer conductor and a dielectric material layer therebetween;
    said inner conductor comprising a tubular bimetallic layer having a pair of opposing longitudinal edges at a longitudinal seam;

said tubular bimetallic layer comprising an inner aluminum layer and an outer copper layer bonded thereto;

each of said opposing longitudinal edges of said tubular bimetallic layer being at least partially bevelled at the longitudinal seam;

the longitudinal seam comprising a welded joint between at least portions of said inner aluminum layer.

12. A coaxial cable according to claim 11 wherein each opposing longitudinal edge is at least partially bevelled at an angle from normal to an inner surface of said tubular bimetallic layer in a range of between 20 and 70 degrees.

13. A coaxial cable according to claim 11 wherein said wherein said tubular bimetallic layer has a thickness in a range of about 0.005 to 0.050 inches.

14. A coaxial cable according to claim 11 wherein said outer copper layer has a percentage thickness relative to an overall thickness of said tubular bimetallic layer in a range of about1 to 30 %.

15. A coaxial cable according to claim 11 further comprising another dielectric material layer filling said tubular bimetallic layer.

16. A coaxial cable according to claim 11 further comprising an insulating jacket surrounding said outer conductor.

17. A method for making a coaxial cable comprising an inner conductor, an outer conductor and a dielectric material layer therebetween, the method comprising:

forming the inner conductor by at least forming a bimetallic strip into a tubular bimetallic layer having a pair of opposing longitudinal edges at a longitudinal seam, the tubular bimetallic layer comprising an inner metal layer and an outer metal layer bonded thereto with the inner metal layer having a lower melting temperature than the outer metal layer, and at least one of the opposing longitudinal edges of the tubular bimetallic layer being at least partially bevelled, welding the longitudinal seam to form a welded joint between at least portions of the opposing longitudinal edges;

forming the dielectric material layer surrounding the inner conductor; and forming the outer conductor surrounding the dielectric material layer.

18. A method according to claim 17 wherein each longitudinal edge of the tubular bimetallic layer is bevelled to define a V-shaped notch at the longitudinal seam prior to welding.

19. A method according to claim 17 wherein the at least one opposing longitudinal edge is bevelled at an angle from normal to an inner surface of the tubular bimetallic layer in a range of between 20 and 70 degrees.

20. A method according to claim 17 wherein the inner metal layer comprises aluminum, and wherein and the outer metal layer comprises copper.

21. A method according to claim 17 wherein the wherein the tubular bimetallic layer has a thickness in a range of about 0.005 to 0.050 inches.

22. A method according to claim 17 wherein the outer metal layer has a percentage thickness relative to an overall thickness of the tubular bimetallic layer in a range of about 1 to 30 %.

* * * * *

UNITED STATES PATENT AND TRADEMARK OFFICE
CERTIFICATE OF CORRECTION

PATENT NO. : 7,687,717 B2  Page 1 of 1
APPLICATION NO. : 11/957020
DATED : March 30, 2010
INVENTOR(S) : Moe et al.

It is certified that error appears in the above-identified patent and that said Letters Patent is hereby corrected as shown below:

Column 3, Line 40    Delete: "is schematic"
                     Insert: --is a schematic--

Column 6, Line 48    Delete: "and said"
                     Insert: --said--

Column 6, Line 50    Delete: "wherein said"

Column 8, Line 23    Delete: "wherein the"

Signed and Sealed this

Thirty-first Day of August, 2010

David J. Kappos
*Director of the United States Patent and Trademark Office*